(12) United States Patent
Jang et al.

(10) Patent No.: US 10,349,436 B2
(45) Date of Patent: Jul. 9, 2019

(54) METHOD AND APPARATUS FOR TRANSMITTING A BUFFER STATUS REPORT IN A WIRELESS COMMUNICATION SYSTEM

(75) Inventors: Jae Hyuk Jang, Gyeonggi-do (KR); Seong Hun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 445 days.

(21) Appl. No.: 14/006,081

(22) PCT Filed: Mar. 19, 2012

(86) PCT No.: PCT/KR2012/001915
§ 371 (c)(1),
(2), (4) Date: Sep. 18, 2013

(87) PCT Pub. No.: WO2012/128511
PCT Pub. Date: Sep. 27, 2012

(65) Prior Publication Data
US 2015/0043352 A1 Feb. 12, 2015
US 2019/0159235 A9 May 23, 2019

Related U.S. Application Data

(60) Provisional application No. 61/477,339, filed on Apr. 20, 2011, provisional application No. 61/454,110, filed on Mar. 18, 2011.

(51) Int. Cl.
*H04L 12/26* (2006.01)
*H04W 72/12* (2009.01)
(Continued)

(52) U.S. Cl.
CPC ....... *H04W 72/1284* (2013.01); *H04L 41/065* (2013.01); *H04L 43/065* (2013.01); *H04W 24/10* (2013.01)

(58) Field of Classification Search
None
See application file for complete search history.

(56) References Cited

U.S. PATENT DOCUMENTS

2009/0219951 A1* 9/2009 Chun ............... H04W 8/26
370/474
2010/0008236 A1* 1/2010 Zhang ............ H04W 72/1284
370/241

(Continued)

FOREIGN PATENT DOCUMENTS

| CN | 101562894 A | 10/2009 |
| CN | 101772049 A | 7/2010 |

(Continued)

OTHER PUBLICATIONS

Extended European Search Report dated Jul. 29, 2014 in connection with European Patent Application No. 12761045.9, 6 pages.

(Continued)

*Primary Examiner* — Edan Orgad (57) ABSTRACT

The present disclosure proposes a method for transmitting a buffer status report informing of the data to be transmit in uplink. The method for transmitting buffer status report of a terminal in a wireless communication system includes checking, when allocating uplink resource for new data transmission, whether first buffer status report triggered but not cancelled exists, generating, when the first buffer status report exists, uplink data including the buffer status report, checking whether second buffer status report triggered but not cancelled exist except for the buffers status report included in the uplink data, and determining whether to cancel the second buffer status report depending on whether the first buffer status report is a regular buffer status report or periodic buffer status report. With the proposed method, the terminal is capable of transmitting the padding BSR (Continued)

without extra cancellation operation, resulting in reduction terminal's operation complexity.

10 Claims, 5 Drawing Sheets

(51) Int. Cl.
*H04W 24/10* (2009.01)
*H04L 12/24* (2006.01)

(56) References Cited

U.S. PATENT DOCUMENTS

| | | | |
|---|---|---|---|
| 2010/0115355 A1* | 5/2010 | Hsu | H04W 72/1284 |
| | | | 714/726 |
| 2010/0329204 A1* | 12/2010 | Guo | H04W 72/1278 |
| | | | 370/329 |
| 2011/0055387 A1 | 3/2011 | Tseng et al. | |
| 2011/0085566 A1 | 4/2011 | Bucknell et al. | |
| 2013/0272319 A1 | 10/2013 | Chun et al. | |

FOREIGN PATENT DOCUMENTS

| | | |
|---|---|---|
| CN | 101778418 A | 7/2010 |
| CN | 101953096 A | 1/2011 |
| EP | 2166810 A2 | 3/2010 |
| JP | 2010-529727 | 8/2010 |
| JP | 2011-055464 A | 3/2011 |
| JP | 2011-515891 A | 5/2011 |
| JP | 2011-525742 A | 9/2011 |
| KR | 2009-0090274 A | 8/2009 |
| KR | 10-2009-0106442 | 10/2009 |
| KR | 10-2010-0132431 | 12/2010 |
| WO | 2009-104928 A1 | 8/2009 |
| WO | 2009-156917 A1 | 12/2009 |

OTHER PUBLICATIONS

Panasonic, "Cancellation of BSR", 3GPP TSG-RAN-WG2 Meeting #73, Taipei, Taiwan, Feb. 21-25, 2011, R2-110893, 3 pages.
3GPP TS 36.321 V10.0.0, "3rd Generation Partnership Project; Technical Specification Group Radio Access Network; Evolved Universal Terrestrial Radio Access (E-UTRA); Medium Access Control (MAC) protocol specification (Release 10)", Mobile Competence Centre; Valbonne, France, Dec. 17, 2010, 53 pages.
International Search Report dated Oct. 23, 2012 in connection with International Patent Application No. PCT/KR2012/001915, 3 pages.
Written Opinion of International Searching Authority dated Oct. 23, 2012 in connection with International Patent Application No. PCT/KR2012/001915, 3 pages.
Office Action dated May 17, 2016 in connection with Chinese Patent Application No. 2012800139901.
Office Action dated Jun. 2, 2016 in connection with Chinese Patent Application No. 2012800139901.
Japanese Office Action issued for JP 2013-558792 dated Feb. 8, 2016, 8 pgs.
LG Electronics, "Correction to Multiple BSRs", 3GPP TSG-RAN WG2 Meeting #64, R2-086138, Nov. 2010, 3 pgs.
Ericsson, "Introduction of Carrier Aggregation", 3GPP TSG-RAN Meeting #72, R2-103133, Nov. 2010, 51 pgs.
Japanese Patent Office, "Notice of Allowance," Application No. 2013-558792, dated Oct. 19, 2016, 6 pages, publisher JPO, Tokyo, Japan.
Korean Intellectual Property Office, "Notification of Preliminary Rejection," Application No. 10-2012-0027307, dated Oct. 30, 2016, 7 pages, publisher KIPO, Daejeon, Republic of Korea.

* cited by examiner

METHOD AND APPARATUS FOR TRANSMITTING A BUFFER STATUS REPORT IN A WIRELESS COMMUNICATION SYSTEM

CROSS-REFERENCE TO RELATED APPLICATION(S)

The present application claims priority under 35 U.S.C. § 365 to International Patent Application No. PCT/KR2012/001915 filed Mar. 19, 2012, entitled "METHOD AND APPARATUS FOR TRANSMITTING A BUFFER STATUS REPORT IN A WIRELESS COMMUNICATION SYSTEM". International Patent Application No. PCT/KR2012/001915claims priority under 35 U.S.C. § 365 and/or 35 U.S.C. § 119(a) to United States Provisional Patent Application No. 61/454,110 filed Mar. 18, 2011 and United States Provisional Patent Application No. 61/477,339 filed Apr. 20, 2011 and which are incorporated herein by reference into the present disclosure as if fully set forth herein.

TECHNICAL FIELD

The present disclosure relates to a wireless communication system and, in particular, to a method for transmitting a buffer status report informing of the data to be transmit in uplink.

BACKGROUND ART

In order to meet the rapid increase in demand for mobile data, the wireless communication system has evolved over and over again and current representative communication system is Long Term Evolution (LTE) system.

In the LTE system, when it has data to be transmitted in uplink buffer, the terminal notifies base station of the current buffer state by transmitting a Buffer Status Report (BSR). Meanwhile, there is a need of defining the operation to be performed depending on whether the BSR is a normal BSR, periodic BSR, or BSR transmitted using the padding resource remained after base station's scheduling.

DISCLOSURE OF INVENTION

Technical Problem

The present disclosure has been conceived to solve the above problem and aims to provide a method transmitting a padding BSR at the terminal supporting normal or periodic BSR.

Solution to Problem

In order to solve the above problem, the terminal transmits, when the resource is remained in transmitting uplink data, a padding BSR and, although there is regular BSR or periodic BSR in the uplink data, skips cancelling regular or periodic BSR transmission.

In order to solve the above problem, a method for transmitting buffer status report of a terminal in a wireless communication system includes checking, when allocating uplink resource for new data transmission, whether first buffer status report triggered but not cancelled exists, generating, when the first buffer status report exists, uplink data including the buffer status report, checking whether second buffer status report triggered but not cancelled exist except for the buffers status report included in the uplink data, and determining whether to cancel the second buffer status report depending on whether the first buffer status report is a regular buffer status report or periodic buffer status report.

A terminal for reporting buffer status in a wireless communication system according to the present disclosure includes a transceiver which communicating signals with a base station and a controller which checks, when allocating uplink resource for new data transmission, whether first buffer status report triggered but not cancelled exists, generates, when the first buffer status report exists, uplink data including the buffer status report, checks whether second buffer status report triggered but not cancelled exist except for the buffers status report included in the uplink data, and determines whether to cancel the second buffer status report depending on whether the first buffer status report is a regular buffer status report or periodic buffer status report.

Advantageous Effects of Invention

With the proposed method, the terminal is capable of transmitting the padding BSR without extra cancellation operation, resulting in reduction terminal's operation complexity.

MODE FOR THE INVENTION

Detailed description of well-known functions and structures incorporated herein may be omitted to avoid obscuring the subject matter of the present disclosure. Exemplary embodiments of the present disclosure are described with reference to the accompanying drawings in detail.

Although the description is directed to the LTE system as a cellular communication system for simplicity of explanation, the present disclosure is also applicable to other well-known cellular communication systems. In the following description, the LTE terminal is referred to as User Equipment (UE) and the LTE base station is referred to as evolved Node B (eNB).

Figure 1:
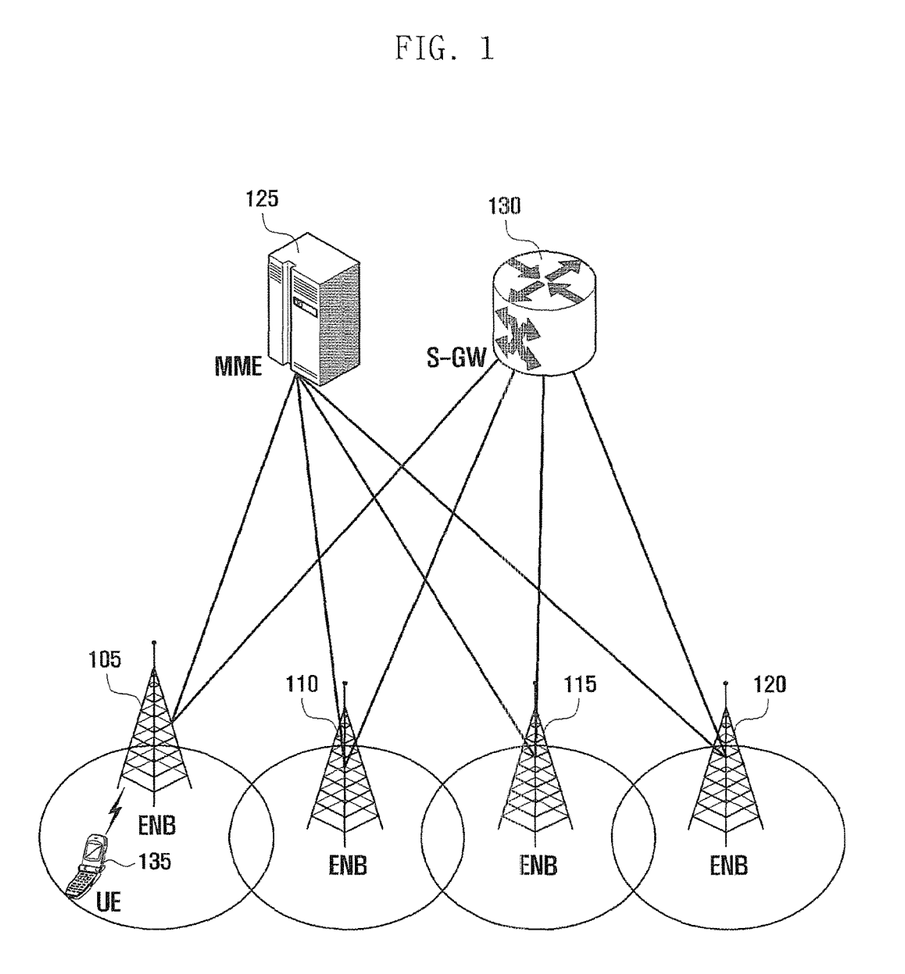
FIG. 1 is a diagram illustrating architecture of an LTE system to which the present disclosure is applied.

FIG. 1 is a diagram illustrating architecture of an LTE system to which the present disclosure is applied.

Referring to FIG. 1, the radio access network of the LTE system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

FIG. 1, the eNBs 105, 110, 115, and 120 correspond to legacy node Bs of Universal Mobile Communications System (UMTS). The eNBs 105, 110, 115, and 120 allow the UE establish a radio link and are responsible for complicated functions as compared to the legacy node B. In the LTE system, all the user traffic including real time services such as Voice over Internet Protocol (VoIP) are provided through a shared channel and thus there is a need of a device located in the eNB to schedule data based on the state information such as UE buffer conditions, power headroom state, and channel state. In order to meet the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The AMC is a technique for determining the modulation scheme and channel coding rate for the channel condition. The S-GW 130 is an entity to provide data bearers and establishes and releases data bearers under the control of the MME 125. MME 125 is responsible for various control functions and connected to a plurality of eNBs 105, 110, 115, and 120.

Figure 2:
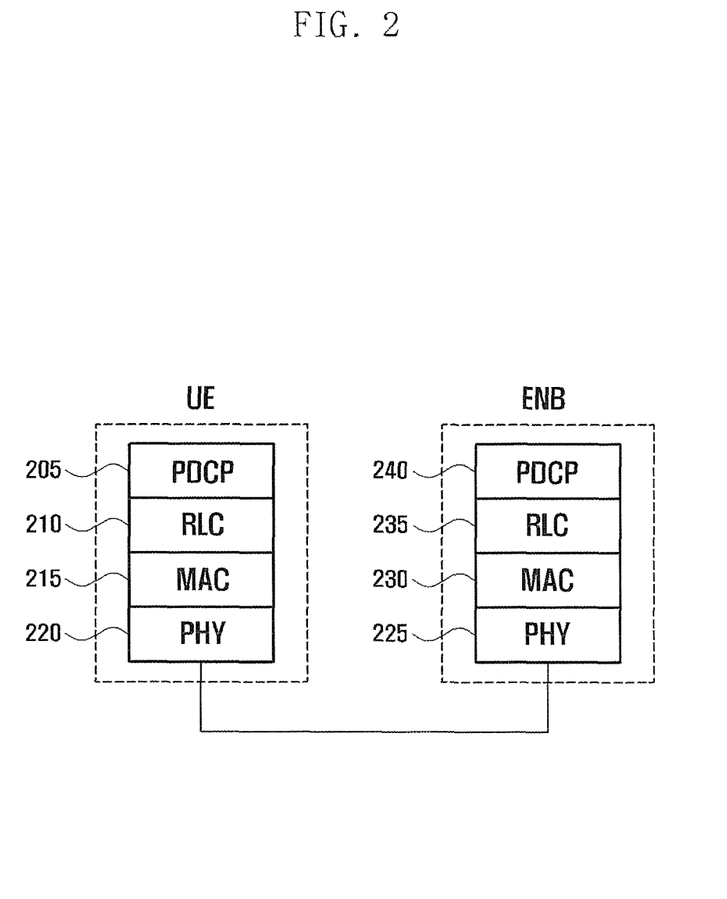
FIG. 2 is a diagram illustrating a protocol stack of the LTE system to which the present disclosure is applied.

FIG. 2 is a diagram illustrating a protocol stack of the LTE system to which the present disclosure is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression. The RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The MAC PDUs are delivered to the PHY 220 and 225. The MAC 215 and 230 demultiplexes the MAC PDUs from the PHY 220 and 225 into RLC PDUs and delivers the RLC PDUs to corresponding RLC entities. The PHY 220 and 225 performs channel coding and modulation on the higher layer data to transmit the modulation result through a radio channel in the form of OFDM symbols and demodulation and channel decoding on the OFDM symbols received through the radio channel to deliver the decoded data to the higher layer.

In the case that heterogeneous devices coexist in the UE, the normal measurement and report method is not a good method for solve such interference problem. Although the inter-device interference, which occurs sporadically, causes the problem of data transmission failure for the interference occurrence time, the influence of such interference is averaged for long time so as not to be reflected. Typically, the services provided to the user have respective Quality of Service (QoS) requirements including Block Error Rate (BLER). This is a value of average transmission failure probability of packets and indicates how much actual data have transmitted successfully.

Figure 3:
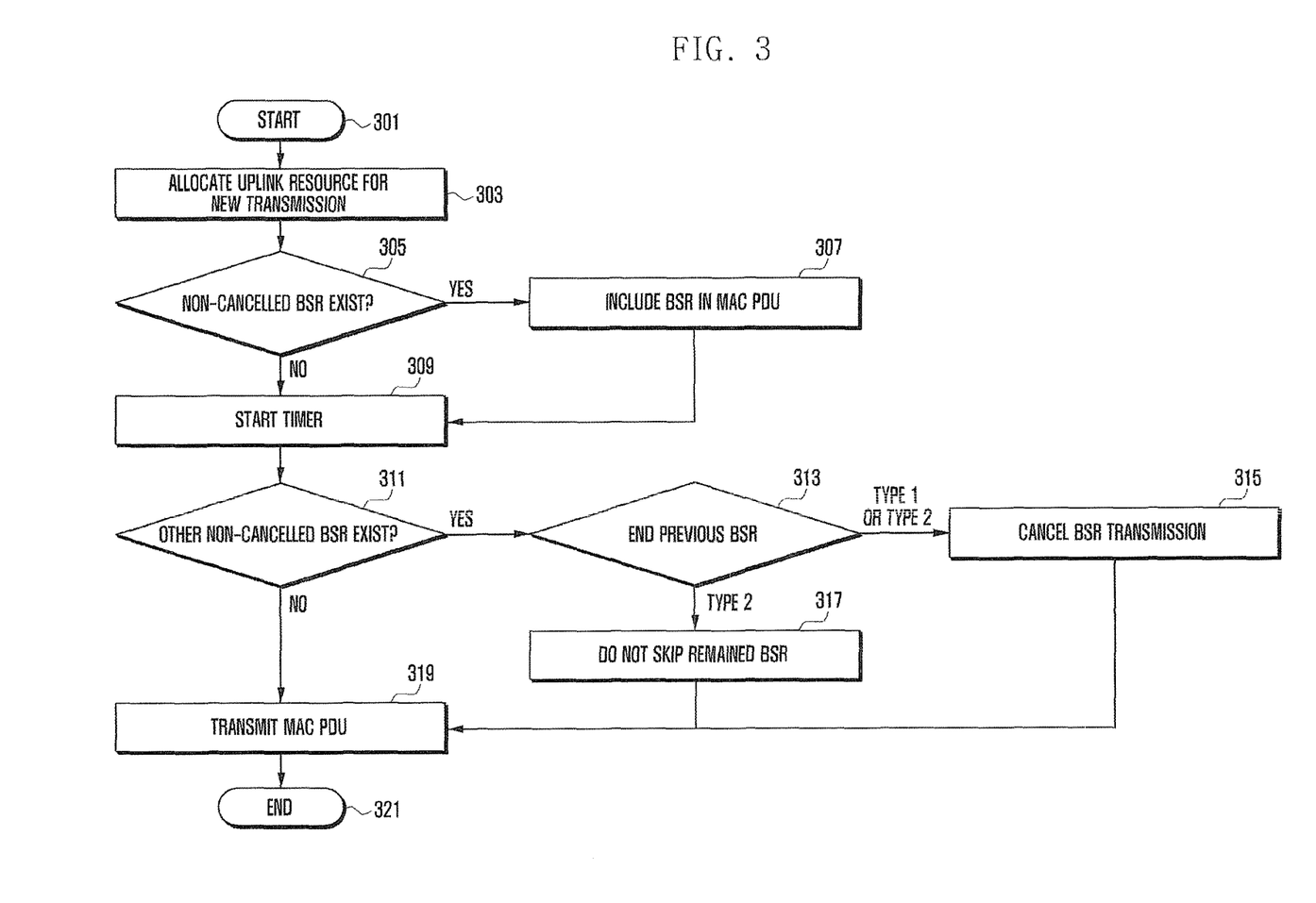
FIG. 3 is a flowchart illustrating a UE operation procedure according to the first embodiment of the present disclosure.

FIG. 3 is a flowchart illustrating a UE operation procedure according to the first embodiment of the present disclosure.

The UE starts communication with the eNB at operation 301 and is allocated uplink resource from the eNB for new data transmission at operation 303.

Next, the UE determines whether there is any BSR which has been triggered but not cancelled at operation 305. Here, BSR is the information of reporting data amount accumulated (or stored) in the UE's buffer per Logical Channel Group (LCG). Up to 4 LCGs may be configured, and LCG is a set of logical channels having similar QoS requirements. The LCG is configured by eNB per UE.

If there is any BSR which has not been canceled, the UE includes the BSR in a MAC PDU (i.e. uplink data) at operation 307. The buffer status is contained in the BSR according to the following rules.

If the uplink resource for new data is available for transmitting only one MAC PDU, the UE includes the data in the corresponding MAC PDU and logs the buffer state in the BSR.

If the uplink resource for the new data is available for transmitting plural MAC PDUs at the same subframe (i.e. large amount of resource is allocated), the UE includes all MAC PDUs in the same subframe and logs the buffer station in the BSR.

BSR is the control information reporting buffer status per LCB.

The UE generates a BSR MAC control element including the BSR content and includes the BSR MAC control element in the MAC PDU and, if the BSR is not a truncated BSR, (re)starts a periodicBSR-Timer and retxBSR-Timer at operation 309. The truncated BSR is the BSR including partial buffer status other than entire buffer status, the periodicBSR-Timer is the timer for periodic BSR transmission, and retxBSR-Timer is the timer for BSR retransmission when uplink resource is not allocated for BSR.

There are several types of BSRs as follows.

First type: Regular BSR

BSR transmitted after expiry of the retxBSR-Timer when the UE has data that can be transmitted for a certain logical channel belonging to the LCG.

BSR transmitted when data occurs from a higher layer (RLC or PDCP layer) for the logical channel belonging to the LCG and the data has the priority higher than any of the logical channel belonging to the LCG.

BSR transmitted when data to be transmitted occurs from a higher layer (RLC or PDCP layer) for the logical channel belonging to the LCG and there is no other data with the exception of the corresponding data in any LCG.

Second type: Periodic BSR

BSR transmitted when the periodicBSR-Timer expires.

Third type: Padding BSR

BSR when uplink resource is allocated and the padding bits filling the space remained after transmitting the data is equal to or greater than the sum of the size of BSR MAC Control Element and the size of the sub-header of the BSR MAC Control Element.

Although the BSR may have been triggered several times, only one BSR is included in on MAC PDU. The UE determines, at operation 311, whether there is any BSR triggered but not cancelled at previous operation in addition to the BSR included in the MAC PDU. If such BSR exists, the UE checks, at operation 313, the type of the BSR included in the MAC PDU at previous operation.

If type 1 or type 2 BSR has been included in the MAC PDU, the UE cancels the remained BSRs at operation 315.

Otherwise, if type 3 BSR has been included in the MAC PDU, the UE does not cancel the remained BSRs at operation 317.

Afterward, the UE transmits the generated MAC PDU at operation 319 and ends the procedure at operation 321.

Figure 4:
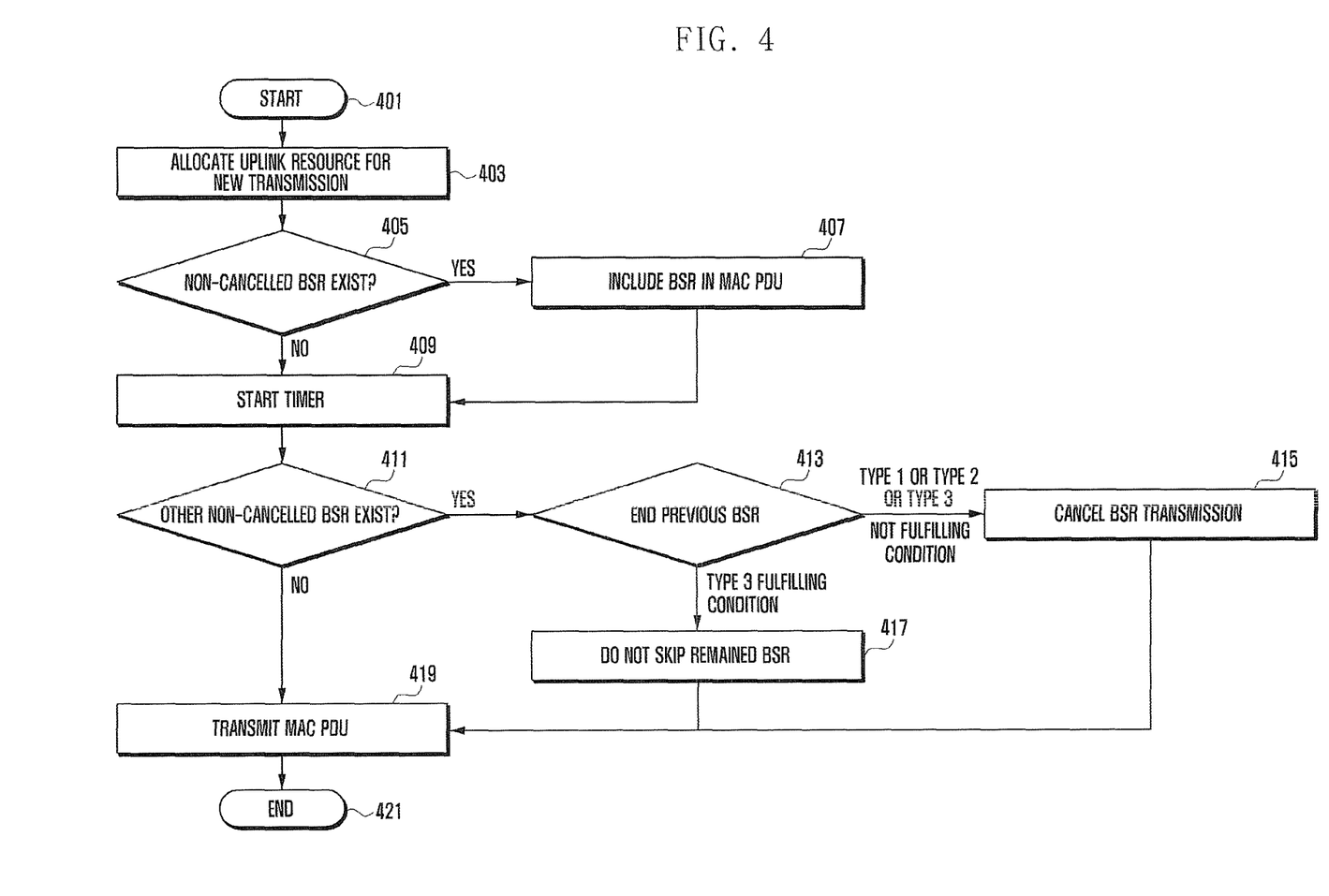
FIG. 4 is a flowchart illustrating a UE operation procedure according to the second embodiment of the present disclosure.

FIG. 4 is a flowchart illustrating a UE operation procedure according to the second embodiment of the present disclosure.

The UE starts communication with the eNB at operation 401 and is allocated uplink resource from the eNB for new data transmission at operation 403.

Next, the UE determines whether there is any BSR which has been triggered but not cancelled at operation 305. Here, BSR is the information of reporting data amount accumulated (or stored) in the UE's buffer per Logical Channel Group (LCG). Up to 4 LCGs may be configured, and LCG is a set of logical channels having similar QoS requirements. The LCG is configured by eNB per UE.

If there is any BSR which has not been canceled, the UE includes the BSR in the MAC PDU at operation 407. The buffer status is contained in the BSR according to the following rules.

If the uplink resource for new data is available for transmitting only one MAC PDU, the UE includes the data in the corresponding MAC PDU and logs the buffer state in the BSR.

If the uplink resource for the new data is available for transmitting plural MAC PDUs at the same subframe (i.e. large amount of resource is allocated), the UE includes all MAC PDUs in the same subframe and logs the buffer station in the BSR.

The UE generates a BSR MAC control element including the BSR content and includes the BSR MAC control element in the MAC PDU and, if the BSR is not a truncated BSR, (re)starts a periodicBSR-Timer and retxBSR-Timer at operation 309. The truncated BSR is the BSR including partial buffer status other than entire buffer status, the periodic BSR-Timer is the timer for periodic BSR transmission, and retxBSR-Timer is the timer for BSR retransmission when uplink resource is not allocated for BSR.

BSR is the control information reporting buffer status per LCG.
   There are several types of BSRs as follows.
   First type: Regular BSR
      BSR transmitted after expiry of the retxBSR-Timer when the UE has data that can be transmitted for a certain logical channel belonging to the LCG.
      BSR transmitted when data occurs from a higher layer (RLC or PDCP layer) for the logical channel belonging to the LCG and the data has the priority higher than any of the logical channel belonging to the LCG.
      BSR transmitted when data to be transmitted occurs from a higher layer (RLC or PDCP layer) for the logical channel belonging to the LCG and there is no other data with the exception of the corresponding data in any LCG.
   Second type: Periodic BSR
      BSR transmitted when the periodicBSR-Timer expires.
   Third type: Padding BSR
      BSR when uplink resource is allocated and the padding bits filling the space remained after transmitting the data is equal to or greater than the sum of the size of BSR MAC Control Element and the size of the sub-header of the BSR MAC Control Element.

Although the BSR may have been triggered several times, only one BSR is included in on MAC PDU. The UE determines, at operation 411, whether there is any BSR triggered but not cancelled at previous operation in addition to the BSR included in the MAC PDU. If such BSR exists, the UE checks, at operation 413, the type of the BSR included in the MAC PDU at previous operation.

If the type 1 or type 2 BSR has been included in the MAC PDU (i.e. no type 3 BSR has not been included in the MAC PDU), the UE cancels the remained BSRs at operation 415. Typically, the type 3 BSR is not triggered in advance but whether to trigger the type 3 BSR is determined when a specific MAC PDU is generated. Accordingly, although the above operation is triggered when the type 1 or type 2 BSR is transmitted, this has the same meaning that another non-cancelled type 1 or type 2 BSR is cancelled. Or, although the type 3 BSR is included in the MAC PDU, this has the same meaning that type 1 or type 2 BSR triggered but not cancelled yet cannot be cancelled.

The type 3 BSR is classified into one of two subtypes. One is to reflecting the current buffer status correctly, the other is to reflect the currently buffer state partially (reflects only true). Particularly, the latter case is referred to as truncated BSR, and although the padding space is permitted only based on the buffer space of one LCU, the UE is triggered when one or more LCG buffers have data. That is, the type 3 BSR fulfilling the following conditions is the truncated BSR.

condition 1: when the padding bits filling the space remained after transmitting data is equal to or greater than the sum of the short BSR size and its sub-header size and less than the sum of the long BSR size and the sub-header size and when data exist in two or more LCG at the subframe carrying the BSR. In this case, the UE reports only the buffer status of the LCG including the logical channel having the highest priority.

By taking notice of the propriety of the type 3 BSR having two subtypes, since the first subtype BSR reflects the UE's buffer status comedy, if the BSR is transmitted, there is no need to transmit the other BSRs. Accordingly, in spite of the type 3 BSR, there is no need of transmitting the rest type 1 or type 2 BSRs triggered but not cancelled. Since the second subtype BSR reflects the UE's buffer state partially, if the transmission of the type 1 or type 2 BSR. triggered but not cancelled yet is cancelled, it is delayed for the UE to report the correct UE's buffer state to the eNB. Thus, the present disclosure may be modified as follows.

Although the BSR fulfilling the condition 1 among the type 3 BSRs is contained in the MAC PDU, the UE does not cancel the type 1 or type 2 BSR triggered but not cancelled.

If the remained BSRs are not cancelled through above operations, the UE generates the next MAC PDU including the remained BSR at operation 417.

Finally, the UE transmits the generated MAC PDU at operation 419 and ends the procedure at operation 421.

Figure 5:
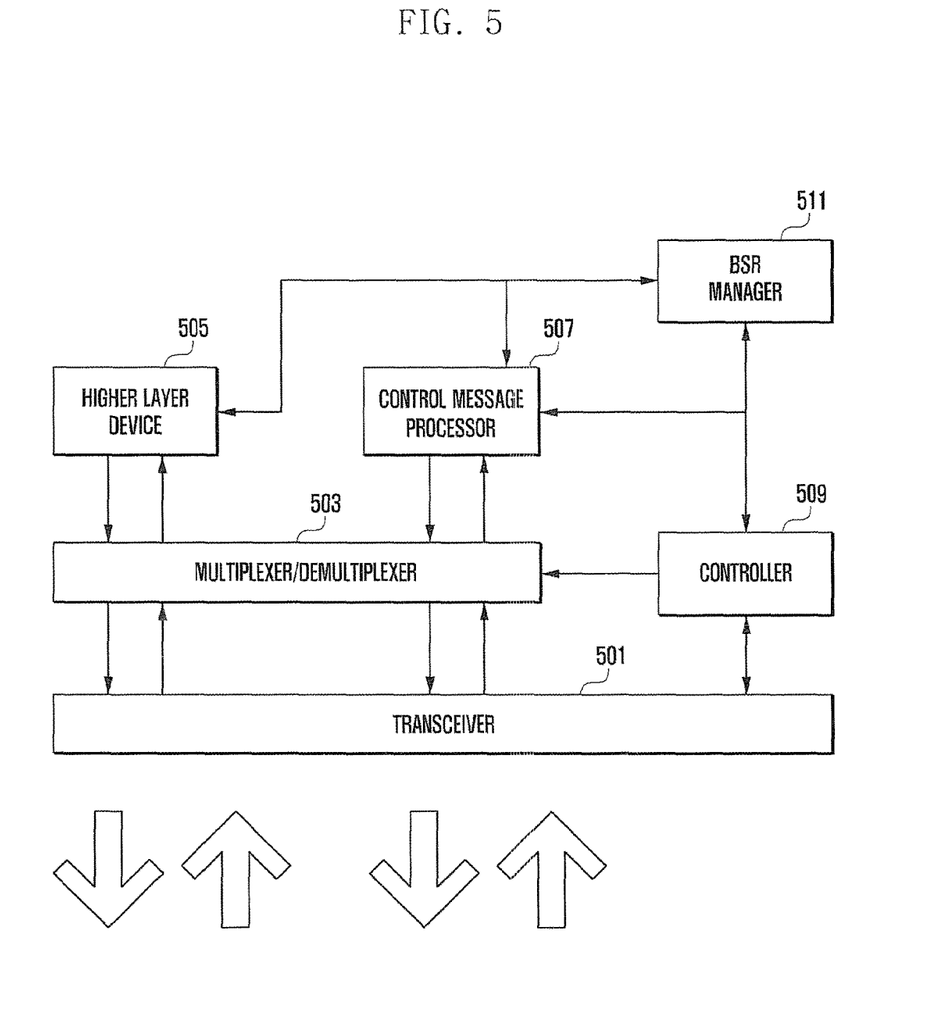
FIG. 5 is a diagram illustrating a configuration of the UE according to an embodiment of the present disclosure.

FIG. 5 is a diagram illustrating a configuration of the UE according to an embodiment of the present disclosure.

The UE transmits and receives data with higher layer device 505 and control messages through the control message processing unit 507 and, in transmission mode, the multiplexer/demultiplexer 503 multiplexes transmission signals and transmits the multiplexed signal through the transceiver 501 and, in reception, the multiplexer/demultiplexer 503 demultiplexes the received signal and deliver the message information to the higher layer device 505 or control message processor 507.

In the present disclosure, the BSR manager 511 checks whether there is new data from the higher layer device 505 and whether there is non-cancelled BSR. If there is any, the BSR manager 511 controls the multiplexer/demultiplexer 503 to include the BSR in the MAC PDU. If it is determined that there is additional BSR, the BSR manager 511 checks the type of the BSR and, if it is padding BSR, does not cancel the legacy BSR.

Although the description is directed to the case where the UE includes plural blocks responsible for different functions, the present disclosure is not limited thereto. for example, the function of the BSR manager 511 may be performed by the controller 509 itself.

In this case, the controller 509 checks the presence/absence of first type buffer status report which has been triggered in allocation uplink resource for new data transmission but not cancelled. If the first buffer status report exists, the controller 509 checks whether there is second type buffer status report triggered but not cancelled in addition to the buffer status report included in the uplink data and, if the second type buffer status report exists, determines whether to cancel the second type buffer status report depending on the first type buffer status report is the regular buffer state report or periodic buffer status report.

In more detail, if the first buffer status report is the regular buffer status report or periodic buffer status report, the controller 509 cancels the second buffer status report. Otherwise if the first buffer status report is the padding buffer status report, the controller 509 does not cancel the second buffer status report.

According to an embodiment of the present disclosure, the controller 509 generates the uplink data and controls to start a timer for transmitting the buffer status report periodically or retransmitting the buffer status report.

With the proposed method, it is possible to perform measurement efficiently based on the current interference status or potential interference factors and notifies the measurement result to the eNB to make a handover decision to the cell capable of reducing interference so as to avoid interference to the interference communication technology and facilitate communication.

Although the description has been made with reference to particular embodiments, the present disclosure can be implemented with various modification without departing from the scope of the present disclosure. Thus, the present disclosure is not limited to the particular embodiments disclosed but will include the following claims and their equivalents.

The invention claimed is:

1. A method for transmitting a buffer status report (BSR) by a terminal in a wireless communication system, the method comprising:

determining that a BSR is triggered;

generating a medium access control (MAC) protocol data unit (PDU) for transmission including the BSR, by canceling an all triggered BSRs if the BSR is a regular BSR or a periodic BSR; and transmitting, to a base station, the MAC PDU including the BSR, wherein the all triggered BSRs are not canceled if the BSR is a padding BSR.

2. A terminal for transmitting a buffer status report (BSR) in a wireless communication system, the terminal comprising:

a transceiver configured to transmit and receive signals; and a controller coupled with the transceiver and configured to:

determine that a BSR is triggered;

generate a medium access control (MAC) protocol data unit (PDU) for transmission including the BSR, by canceling an all triggered BSRs if the BSR is a regular BSR or a periodic BSR; and control the transceiver to transmit, to a base station, the MAC PDU including the BSR, wherein the all triggered BSRs are not canceled if the BSR is a padding BSR.

3. The method of claim 1, wherein the padding BSR is included in the MAC PDU, when padding bits for filling a space remained are equal to or greater than a sum of a size of a BSR control element and a subheader of the BSR control element.

4. The method of claim 1, further comprising starting, after the generating of the MAC PDU, a timer for transmitting a BSR periodically or retransmitting a BSR.

5. The method of claim 1, wherein the BSR included in the MAC PDU is control information for reporting a buffered data amount to be transmitted per logical channel group.

6. The method of claim 1, wherein the BSR included in the MAC PDU logs a status of a buffer remaining after mapping data to be transmitted to an uplink resource if the uplink resource for new data can carry one uplink data, and logs the status of the buffer remained if the uplink resource for the new data is used for transmitting plural uplink data transmitted at a subframe.

7. The terminal of claim 2, wherein the padding BSR is included in the MAC PDU, when padding bits for filling a space remained are equal to or greater than a sum of a size of a BSR control element and a subheader of the BSR control element.

8. The terminal of claim 2, wherein the controller is further configured to start, after the generating of the MAC PDU, a timer for transmitting a BSR periodically or retransmitting a BSR.

9. The terminal of claim 2, wherein the BSR included in the MAC PDU is control information for reporting a buffered data amount to be transmitted per logical channel group.

10. The terminal of claim 2, wherein the BSR included in the MAC PDU logs a status of a buffer remaining after mapping data to be transmitted to an uplink resource if the uplink resource for new data can carry one uplink data, and logs the status of the buffer remained if the uplink resource for the new data is used for transmitting plural uplink data transmitted at a subframe.

* * * * *